July 6, 1926.
C. A. BECKER
1,591,802
BALANCE OR WEIGHING SCALE
Filed July 23, 1924   2 Sheets-Sheet 1
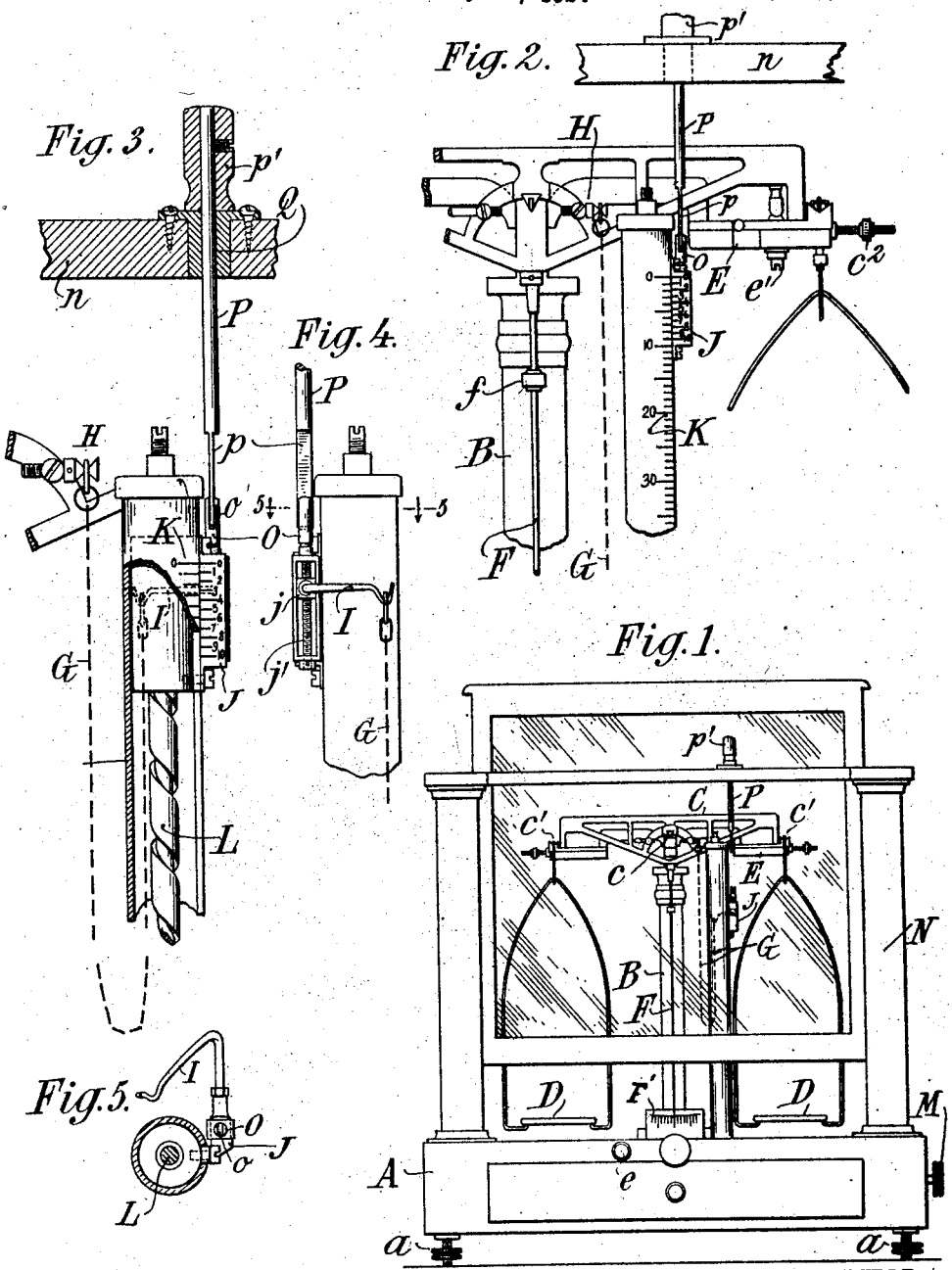
INVENTOR:
Christopher A. Becker,
By Attorneys,
Fraser, Myers & Manley July 6, 1926.  1,591,802
C. A. BECKER
BALANCE OR WEIGHING SCALE
Filed July 23, 1924   2 Sheets-Sheet 2

INVENTOR:
Christopher A. Becker,
By Attorneys,
Fraser, Myers & Manley

Patented July 6, 1926.

1,591,802

UNITED STATES PATENT OFFICE.

CHRISTOPHER A. BECKER, OF NUTLEY, NEW JERSEY, ASSIGNOR TO THE TORSION BALANCE COMPANY, OF NEW YORK, N. Y., A CORPORATION OF NEW YORK.

BALANCE OR WEIGHING SCALE.

Application filed July 23, 1924. Serial No. 727,677.

This invention relates to balances or weighing scales, and particularly to the conventional types of analytical balances which are enclosed in a case to protect the movable parts from dust and disturbance by air currents during the weighing operations, and aims to provide certain improvements therein.

Such balances are commonly constructed with a balance beam hung at its middle on knife edges and having scale pans or the like hung from its ends, one or both ends of the beam being provided with an adjusting nut for adjusting the equilibrium of the balance preliminary to the weighing operations. In making such adjustment the front sash of the enclosing case must usually be raised and lowered several times, which action is time-consuming and not infrequently, owing to the warmth of the hand when handling the beam, introduces a source of error.

According to the present invention means are provided whereby the preliminary adjustment of the equilibrium of a balance can be more quickly and accurately made. This I accomplish by providing means operable from the exterior of the enclosing case for moving the equilibrium adjusting element of the balance, which element may be a modified form of the conventional nut at the end of the balance beam, or the improved means hereinafter described and applicable to balances wherein small weighings are made by varying the length of the beam component of a uniform chain supported at one end by the beam and at the other end by a vertically-movable slide. An important additional advantage of the latter adjusting means is that it is operable while the beam is in swinging position.

The invention also includes other features of improvement which will be hereinafter more fully described.

In the accompanying drawings wherein I have shown two preferred embodiments of my invention, Figure 1 is a front elevation of an analytical or jeweler's balance;

Fig. 2 is a fractional elevation of a portion of the balance showing the present invention applied thereto;

Fig. 3 is a view similar to Fig. 2 on an enlarged scale;

Fig. 4 is a fractional side elevation of Fig. 3, viewed from the left,

Figure 6:
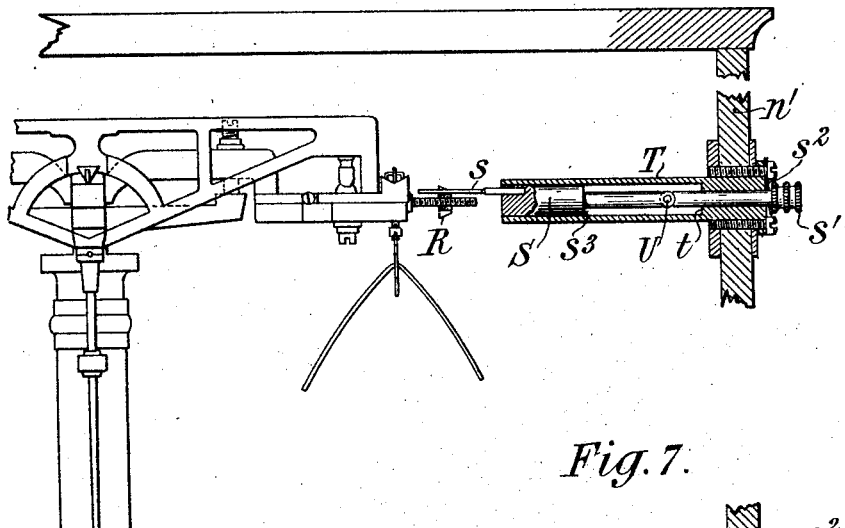

Fig. 5 a is a section of Fig. 4 taken on the line 5—5;

Fig. 6 is a view similar to Fig. 2 showing a modification of the invention.

Figs. 7 to 11, inclusive, show details of the modification disclosed in Fig. 6.

Referring first to Figs. 1 to 5 of the drawings, there is disclosed the conventional analytical or jeweler's balance which comprises a base A mounted upon leveling screws $a$, and mounted vertically upon the base is a column B upon which a balance beam C is adapted to be supported through its middle knife edge $c$. The balance beam is provided at its ends with knife edges $c'$, from which are hung the pans D or any other means adapted to receive weights or objects to be weighed. For normally maintaining the balance beam knife edges out of contact with their supporting elements, and for gradually lowering the knife edges into contact with said elements, there is provided a beam arrest E operable through an eccentric slide (not shown) by a thumb wheel $e$, the beam arrest having the usual adjusting screws $e'$. The column B and the beam arrest E together constitute the balance stand. The balance beam is also provided with the customary pointer F movable over an index plate F' to show when the balance comes to poise. The indicator needle carries the adjustable gravity weight $f$ for varying the sensitiveness of the balance, and the beam is provided with the conventional adjusting nut $c^2$ for adjusting the equilibrium of the balance.

In the balance shown in Figs. 1 to 5, small weighings are accomplished through the medium of a fine uniform chain G, one end of which is suspended from a carrier H mounted on the beam, and the other end from a hook I carried by a slidable block J movable over a divided scale K. The slidable block is movable through rotation of a vertical screw L operable through intermediate means (not shown) by a thumb wheel M to vary the amount of chain supported by the balance beam. Where fine and accurate weighings are to be made, the movable parts of the balance are enclosed in a case N, the front sash of which is adapted for sliding movement up and down. In Fig. 1 the front sash is shown as slightly raised.

The balance thus far described is the conventional "Chainomatic" balance now in general use and described in detail in my prior Patent No. 1,203,686, dated November 7, 1916.

In this and other types of balances, adjustment of the equilibrium of the balance is accomplished through the medium of the adjusting nut $c^2$ mounted at the end of the balance beam, and in order to make this adjustment the front sash of the enclosing case must usually be raised and lowered several times, and not infrequently, owing to the warmth of the hand in handling the beam, a source of error is introduced into the weighing operations. Not alone this, but considerable time is consumed in making the adjustment in this fashion.

According to the present invention, adjustment of the equilibrium of the balance is made from the exterior of the enclosing case, with its attendant saving of time and elimination of the source of error aforementioned. This I accomplish by varying the dead weight of the chain G, whereby the beam component of the chain is varied to compensate for any inequality in the arms of the balance beam on each side of the central knife edge. The means for accomplishing this consists in supporting the hook I upon a nut $j$ non-rotatably mounted within a guideway formed in the movable slide J, the nut $j$ being threaded upon a swiveled screw $j'$ supported within the movable slide J. The screw $j'$ carries a manipulating extension O formed with a longitudinal slot $o$ adapted to receive a screw driver projection $p$ formed at the lower end of a rotatable slide rod P which passes through a bushing Q mounted in the top $n$ of the enclosing case. The rod P is adapted to be rotated through manipulation of the enlargement $p'$ formed on the outer end thereof. The nut $j$ being non-rotatable, it will be apparent that upon rotation of the projection O the nut will be caused to move upward or downward, depending on the direction of rotation of the screw, and with the movement of the nut there is a corresponding raising or lowering of the dead weight component of the chain G to vary its effective beam component length. The movement of the nut $j$, it will be seen, is independent of any movement of which the movable slide J is capable. Hence, when the zero of the vernier carried by the movable slide J is in alignment with the zero on the scale K, the beam component of the chain may be varied independently of any movement of the slide J to bring the balance into equilibrium, and this adjustment may be made from the exterior of the enclosing case. It will also be noted that, inasmuch as the elements O and P at all times during the period of adjustment bear a definite relationship to one another, adjustment of the equilibrium of the balance may be carried on while the beam is supported upon its central knife edge or in swinging position. This manner of adjustment provides an additional saving of time. Obviously the foregoing described adjusting means may be used either independently of, or in conjunction with, the adjusting nut $c^2$ on the balance beam. Where both adjusting devices are employed in a single balance, the adjusting nut $c^2$ may be used for infrequent approximate adjustment, and the other means for frequent and extremely fine adjustment.

Figure 7:
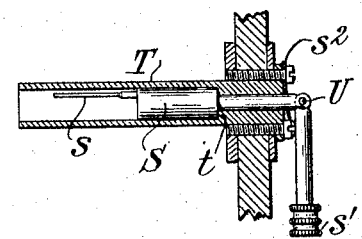
Figure 8:
Figure 9:
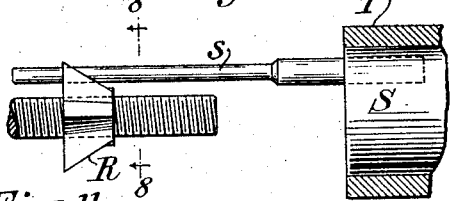
Figure 10:
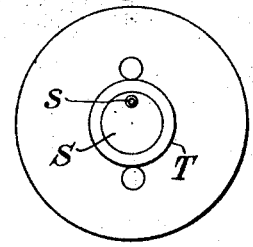
Figure 11:
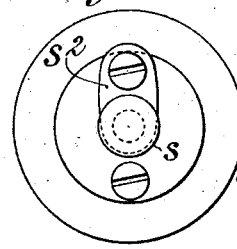

In the embodiment of the invention illustrated in Figs. 6 to 11, adjustment of the equilibrium of the balance is accomplished by modifying the contour of the adjusting nut at the end of the balance beam so as to render it susceptible of movement by an engaging pin operable from the exterior of the enclosing case. This I accomplish by substituting for the conventional thumb adjusting nut $c^2$ a star wheel nut R, and providing a slidable rotatable rod S formed at its inner end with an eccentrically-mounted projecting pin $s$ adapted to engage between the points of the star and to rotate the same upon rotation of the rod S. The rod S is mounted to slide in a suitable bearing T which passes through and is secured to the side wall $n'$ of the enclosing case, and said rod S is formed at its outer end with an enlarged manipulating head $s'$ which may be knurled to provide a better finger grip therefor. The star wheel, which may be of any preferred construction, is preferably formed with its star points tapered between the bases of the nut, with its tapered edges facing the engaging end of the slide rod S, which is long enough to engage the star wheel when at any position on the beam. When the star wheel is at its innermost position on the beam, the accidental application of a turning force thereto tending to advance it farther, would throw the beam from its support, and in order to prevent such action there is provided a spring $s^2$ adapted to engage the enlarged head $s'$ upon inward movement of the rod S, to limit such movement to a point short of engagement with the star wheel. Engagement between the star wheel and rod can then be made by pressing inwardly on the rod to overcome the tension of the spring. The rod S is normally maintained out of engagement with the star wheel by being outwardly withdrawn from the casing T until a shoulder $s^3$ formed on the rod S engages against a shoulder $t$ formed in the bearing T. To insure against accidental inward movement of the slide rod S, and also to avoid accidental engagement therewith when in withdrawn position, the rod S is preferably formed in two parts hinged together as shown at U, the outer section being adapted upon withdrawal to take up the position as shown in Fig. 7.

The manner in which the equilibrium adjustment is made on a balance involving the present construction, is thought to be obvious from the foregoing description, inasmuch as it is substantially the same as that heretofore commonly availed of in balances employing a manually-operable adjusting nut, except that in the present construction rotation of the adjusting nut is accomplished from the exterior of the enclosing case.

While I have shown and described certain preferred embodiments of my invention, it will be understood that various changes may be made therein without departing from the spirit of the invention.

I claim as my invention:—

1. A balance or weighing scale comprising an enclosing case, a stand, a balance beam having adjustment means thereon, means independent of the adjustment means on the balance beam for bringing the balance into equipoise during a weighing operation, and means operable from the exterior of the enclosing case adapted to cooperate with the adjustment means on the balance beam for adjusting the equilibrium of the balance preliminary to the weighing operation, the adjustment means on the balance beam and the means operable from the exterior of the enclosing case being normally out of engagement.

2. A balance or weighing scale comprising an enclosing case, a stand, a balance beam having adjustment means theron, means independent of the adjustment means on the balance beam for bringing the balance into equipoise during a weighing operation, and means operable from the exterior of the enclosing case adapted to cooperate with the adjustment means on the balance beam for adjusting the equilibrium of the balance preliminary to the weighing operation, said last-named means comprising a rod slidably mounted in a wall of the enclosing case.

3. A balance or weighing scale comprising an enclosing case, a stand, a balance beam having a central knife edge upon which it is adapted to swing, means for bringing the balance into equipoise during the weighing operation, and means operable from the exterior of the enclosing case adapted for adjusting the equilibrium of the balance preliminary to the weighing operation, said last-named adjustment being adapted to be made while the beam is in swinging motion.

4. A balance or weighing scale comprising a stand, a balance beam, a vertically movable slide, a weighing chain hung at one end from the beam and at its other from an element which is carried by but is independently movable with respect to the vertically-movable slide, means for moving the vertically-movable slide, and separate means for moving the element independently of the slide.

5. A balance or weighing scale comprising a stand, a balance beam, a vertically movable slide, a weighing chain hung at one end from the beam and at the other from the vertically-movable slide, and means for adjusting the equilibrium of the balance by varying the length of the slide component of the chain without moving the slide.

6. A balance or weighing scale comprising a stand, a balance beam, a vertically movable slide, having an independently movable element thereon, a weighing chain hung at one end from the beam and at the other from the independently movable element, and means for adjusting the equilibrium of the balance by varying the position of the movable element with respect to the vertically-movable slide.

7. A balance or weighing scale comprising a stand, a balance beam, a vertically movable slide, a weighing chain hung at one end from the beam and at the other from the vertically-movable slide and an enclosing case, and means operable from the exterior of the enclosing case for adjusting the equilibrium of the balance by varying the length of the slide component of the chain without moving the slide.

8. A balance or weighing scale comprising a stand, a balance beam, a vertically movable slide, having a screw threaded member upon which is mounted a non-rotatable nut, a weighing chain hung at one end from the beam and at the other from the non-rotatable nut, an enclosing case, and means operable from the exterior of the case for moving the nut independently of the vertically-movable slide.

9. A balance or weighing scale comprising a stand, a balance beam having an adjusting screw at one end thereof, a nut on said screw, an enclosing case, and manipulating means extending through the side wall of the case and operable from the exterior thereof for turning the nut on the adjusting screw.

10. A balance or weighing scale comprising a stand, a balance beam having an adjusting screw at one end thereof, a nut on said screw, an enclosing case, manipulating means extending through the side wall of the case and operable from the exterior thereof for turning the nut on the adjusting screw, and means for positively preventing accidental engagement between the manipulating means and the nut.

11. A balance or weighing scale comprising a stand, a balance beam having an adjusting screw at one end thereof, a star wheel on said screw, an enclosing case, and a slidable, rotatable rod having an eccentrically-mounted pin on the inner end thereof extending through the side wall of the case and operable from the exterior thereof, and adapted to engage between the points of the star wheel to rotate it in either direction.

12. A balance or weighing scale comprising a stand, a balance beam having an adjusting screw at one end thereof and a star wheel on said screw, the star points being tapered from one base of the wheel to the other.

13. A balance or weighing scale comprising a stand, a balance beam having an adjusting screw at one end thereof, a nut on said screw, an enclosing case, manipulating means extending through the side wall of the case and operable from the exterior thereof for turning the nut on the adjusting screw, and spring means adapted to normally limit the inward movement of the manipulating means to a point short of engagement with the nut when at the inner end of the adjusting screw, but adapted to permit such engagement when the spring tension is overcome.

14. A balance or weighing scale comprising a stand, a balance beam, a chain, one end of which is supported by the beam and the other end by a movable element, and means for adjusting the equilibrium of the balance by varying the length of the beam component of the chain.

In witness whereof, I have hereunto signed my name.

CHRISTOPHER A. BECKER.